United States Patent
Hildebrand

[11] 3,953,129
[45] Apr. 27, 1976

[54] TESTING AND INSPECTING LENS BY HOLOGRAPHIC MEANS

[75] Inventor: Bernard P. Hildebrand, Richland, Wash.

[73] Assignee: The Unites States of America as represented by the Secretary of the Army, Washington, D.C.

[22] Filed: Jan. 9, 1975

[21] Appl. No.: 539,885

[52] U.S. Cl.................................. 356/109; 350/3.5
[51] Int. Cl.² ............................................. G01B 9/02
[58] Field of Search....................... 356/109; 350/3.5

[56] References Cited
UNITED STATES PATENTS 3,604,777  9/1971  Mathisen .............................. 350/3.5
3,833,301  9/1974  Moore .................................. 350/3.5

Primary Examiner—John K. Corbin
Assistant Examiner—Conrad Clark
Attorney, Agent, or Firm—Nathan Edelberg; Robert P. Gibson; Arthur M. Suga

[57] ABSTRACT

Processes for the accurate, rapid and inexpensive testing and inspecting of concave and convex lens surfaces through holographic means requiring no beamsplitters, mirrors or overpower optics, and wherein a hologram formed in accordance with one aspect of the invention contains the entire interferometer and serves as both a master and illuminating source for both concave and said convex surfaces to be so tested.

5 Claims, 6 Drawing Figures

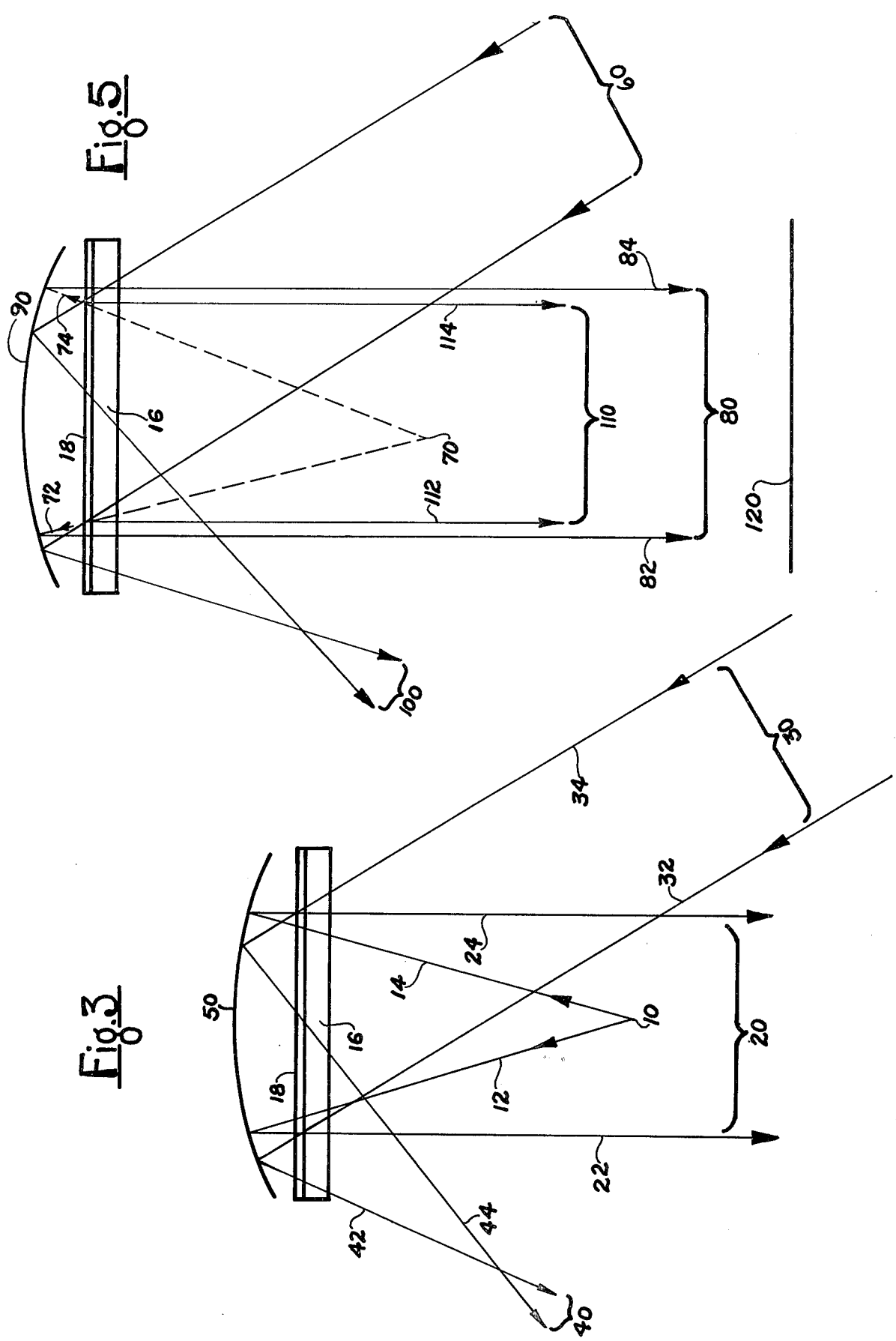

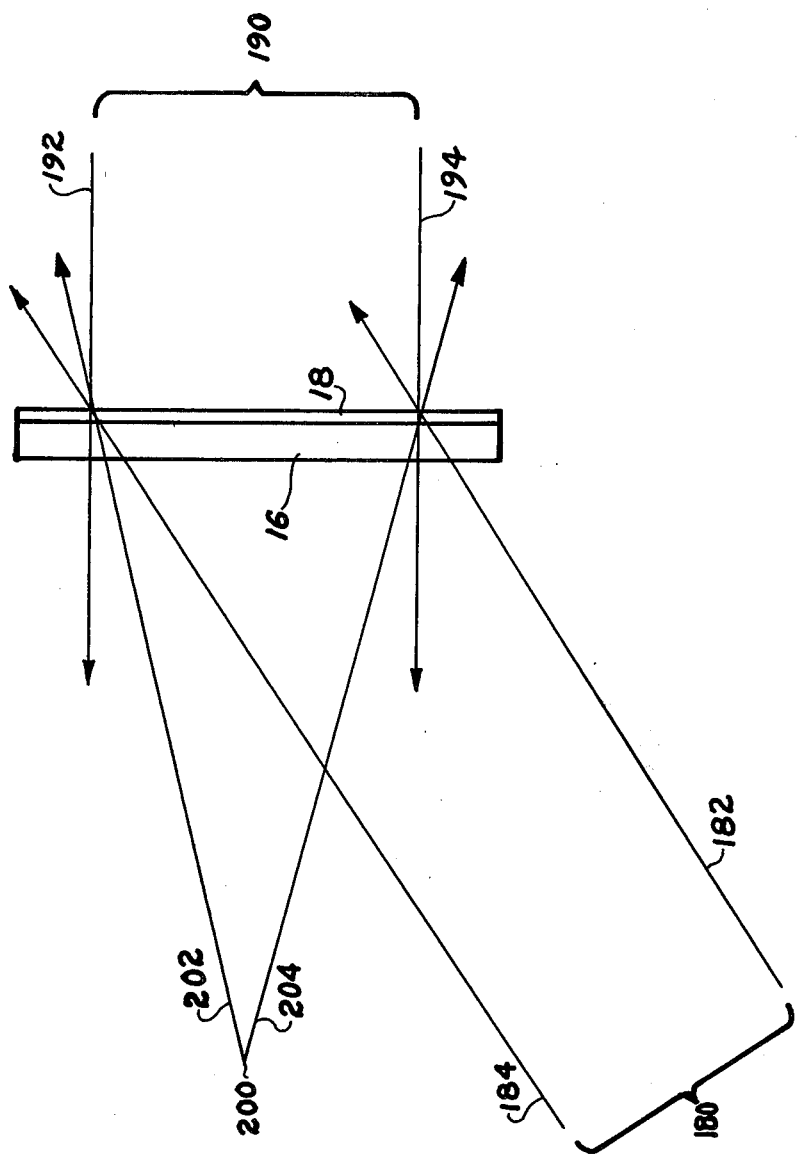

TESTING AND INSPECTING LENS BY HOLOGRAPHIC MEANS

The invention described herein may be manufactured, used and licensed by or for the Government for governmental purposes without the payment to me of any royalty thereon, and was made in the course of, or under a contract with the U.S. Atomic Energy Commission.

This invention relates to lens testing and inspection and more particularly concerns improved optical holographic means for the rapid and economical testing and inspection of lenses during their fabrication processes.

The use of holograms in place of test glasses for the inspection of lens surfaces during their polishing phase is not new. The prior art devices and methods, in the main, employ interferometers, which are quite satisfactory in the testing of special optics, such as aspherics and large aperture optics, but are generally inadequate when it comes to routine testing of mass produced lenses such as are required for many and various military applications.

Test glass usage is based upon the observation of Newton's rings formed therein which are produced by multiple reflections between two nearly coincident surfaces. This method requires each lens design desired or to be fabricated to have a set or precision test glasses ground and polished to the identical configuration of the desired lens surface, but of opposing curvature. At various stages of manufacture of these lenses, the test glass will be placed in contact with the lens to be manufactured and the fringes examined. If the fringes are perfectly circular, the surface being tested is a good one. If, however, the fringes are asymmetrical or jagged, further polishing of the lens desired or to be fabricated will be required. The power or curvature of the surfaces may be determined by the number of rings observed, i.e., if the power is identical to that of the test glass, a single fringe will spread across the entire surface of the test glass. Since lens curvature will change during the polishing thereof, a family of test glasses will be required for each specific lens design to be fabricated. Further, since test glasses must contact the lens to be manufactured, digs and scratches on the test glass surfaces do occur, thus necessitating costly and occasional resurfacing thereof.

It is apparent then that the prior art test glass means for testing and inspecting lens surfaces is not only expensive, but is time consuming and requires the careful storage of a multitude of differing test glasses having varying curvatures.

Accordingly, it is an object of the invention to provide an accurate, rapid and inexpensive means for testing and inspecting lens surfaces.

Another object of the invention is to provide such means for the testing and inspection of lens surfaces which may readily be performed at any stage of lens fabrication.

Still another object of the invention is to provide such means which obviates any necessity of auxiliary equipment such as beamsplitters, mirrors, and overpower optics and wherein said means contains the entire interferometer.

Other objects and advantages of the invention will become apparent from the following description and accompanying drawings wherein:

FIGS. 1 and 2 diagrammatically depict prior art holographic means for testing lens surfaces.

FIG. 3 illustrates diagrammatically the making of a hologram in accordance with my invention.

FIG. 4 illustrates diagrammatically the making of a hologram without the use of a master surface according to may invention.

FIGS. 5 and 6 illustrates the testing of concave and convex lens surfaces respectively using the hologram made in accordance with my invention as shown in FIGS. 3 and 4.

In the basic technique of off-axis holography, two coherent radiation beams are brought together with a finite angle therebetween at a radiation detector to form an interference pattern thereon. For optical holography, the radiation is within the visible region and the detector is usually photographic film which records the interference pattern between the two light radiation beams. One light beam is modified by the object scene to be recorded and the other light beam serves as a reference beam. After exposure and development of the photographic film, it is illuminated with a light beam similar to the reference beam used in constructing the hologram. The reconstructing light beam is diffracted by the recorded interference pattern into at least one diffracted beam which carries information of the object scene for viewing. An image of the object scene is so viewed in full three dimensions including parallax effects as if the object scene itself were being viewed.

Figure 1:
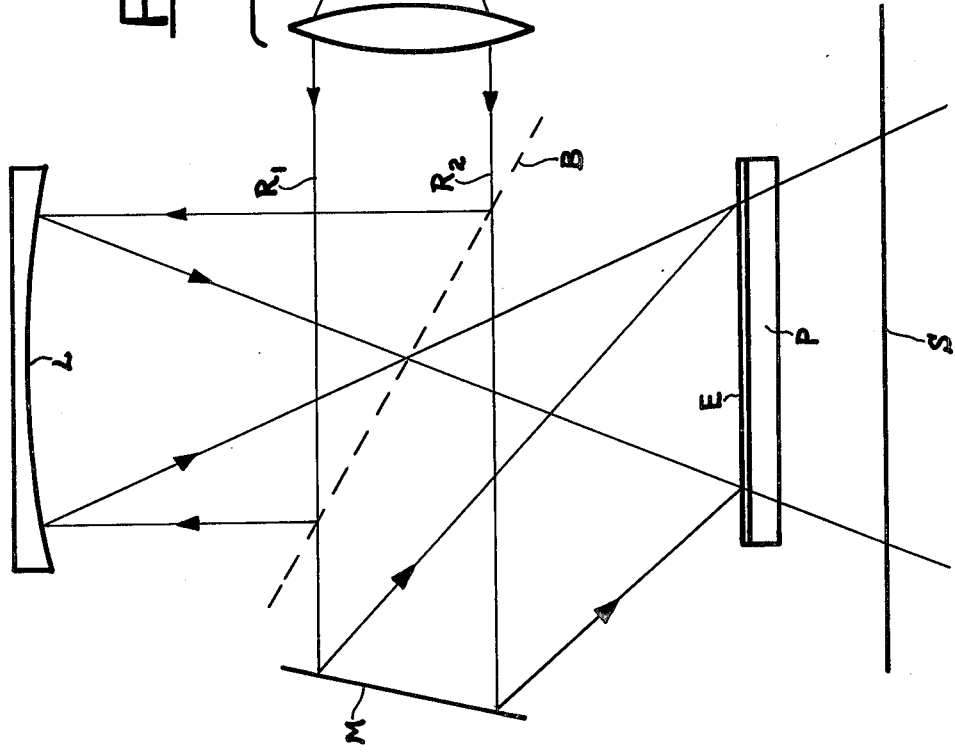

With the above general background information in mind, reference will now be made to the drawings, and particularly to FIGS. 1 and 2 thereof, which depict typical prior art holographic lens testing means, wherein a beam of coherent rays, represented as $R_1$ and $R_2$, emanating from a telescope T, for example, strike beamsplitter B, a portion of the rays being deflected to the concave optic L, which may be the master surface, or the lens to be tested, and the other portion passing therethrough to mirror M, all of the rays being respectively reflected onto a light-sensitive recording medium, such as photographic film or plate P, including an emulsion layer E, which comprises the hologram to me made. In the actual making of the hologram, the master surface will be fixed into place and the hologram developed by conventional means as aforedescribed and in accordance with FIGS. 1 and 2. The newly made hologram having interference patterns recorded therein will now be reinserted into the system and the master surface replaced by the optic or lens surface to be tested. Interference will then occur between the wavefront of the master reconstructed by the hologram and the wavefront reflected by the optical surface to be tested. Fringes identical to those obtained by the test glass methods will appear on screen S.

Figure 2:
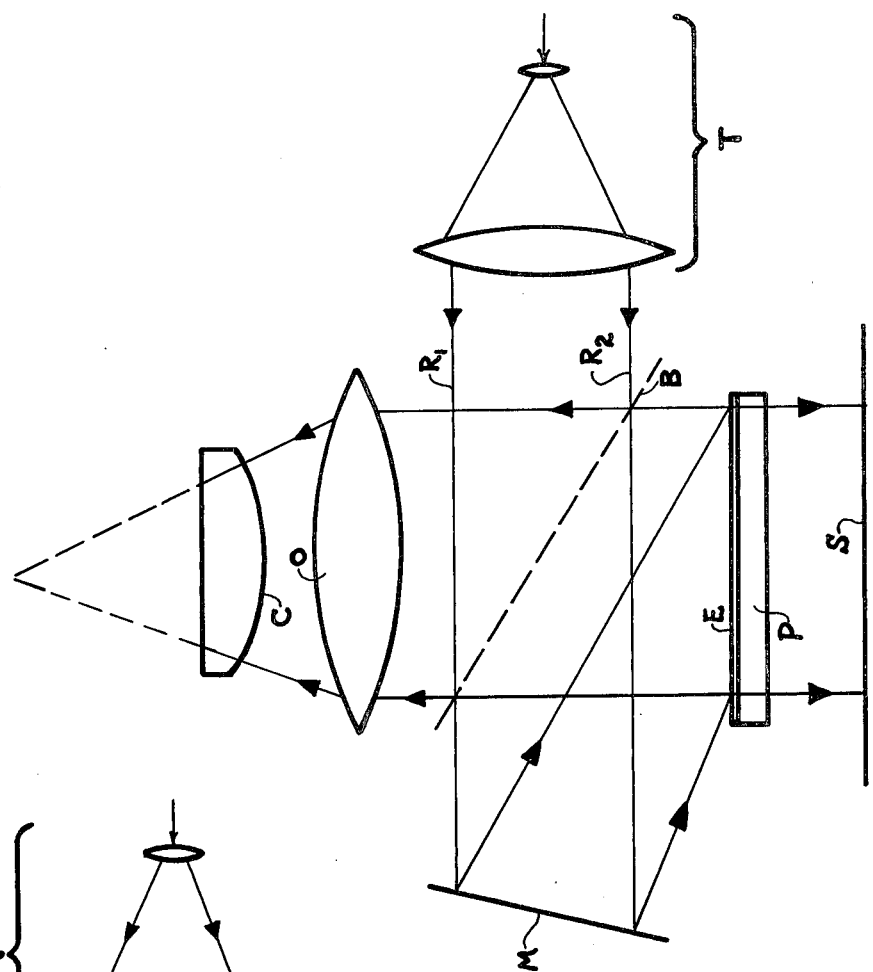

Identical interferometric principles are employed when convex surfaces are to be tested, as depicted in FIG. 2, in which case an overpower optic 0 will be interposed before the convex surface C. The overpower optic is required to provide illumination to the test surface in such a direction that reflected rays from the test surface will not escape the system.

Referring now to FIG. 3 of the drawings, which diagrammatically illustrates the making of a hologram in accordance with my invention, two illuminating beams 10 and 30, the former comprising representative rays 12 and 14 diverging from a point near the focal plane of the master lens surface 50 and the latter beam comprising representative rays 32 and 34 of arbitrary curvature, but most conveniently a plane, are directed through an unbacked photographic plate 16 having its emulsion layer 18 facing the master surface. The beams 10 and 30 will be reflected from master surface 50 back through the plate thus providing beams 20 and 40 respectively. Thus, a total of four beams, i.e., 10, 20, 30 and 40 mutually interfere in emulsion 18, any two of which may be considered as forming a hologram, or a total of six holograms in all. The six holograms are thus formed by beams 10 and 40; 20 and 40; 10 and 20; 30 and 40; 20 and 30; and 10 and 30. Only the latter two holograms are useful for the purposes of my invention, i. e., the two holograms formed by transmission beam 30 interfering with reflected beam 20 yielding an image in reflection, and transmission beam 30 interfering with transmission beam 10 yielding an image in transmission.

In the surface of the lens to be tested is planar, spherical, or parabolic, then a point source may be reflected as a beam having a plane wave. This will occur if the point source is placed at one half the radius of a spherical surface, for example, or at the focus of a parabolic surface. Thus, as shown in FIG. 3, the spherical master surface 50 is illuminated by a diverging source 10, reflecting beam 20 having a plane wave. According to my invention it is therefore possible to dispense with a master surface entirely by using a plane wave beam generated by any suitable means known in the art to represent a master surface.

Thus, as shown in FIG. 4, a third beam 190 having a plane wave is added to take the place of beam 20 of the master surface 50 shown in FIG. 3. The three beams, 180, 190, and 200 may be introduced simultaneously or two at a time; that is, 180 with 200 and then 180 with 190. If all three beams are used simultaneously three holograms result. These are formed by beams 180 and 200; 180 and 190; 200 and 190. Only the former two holograms are useful for purposes of my invention. If the hologram is made by sequential exposures using beams 180 and 190; 180 and 200, only the two desired holograms are present.

The hologram made by interfering beams 180 and 190 yields an image in reflection while the hologram made by interfering beams 180 and 200 yields an image in transmission. The hologram of the master surface made as above described may now be used in testing and inspecting either concave or convex surfaces.

Reference should now be made to FIG. 5 for testing concave surfaces. The master surface 50 will be replaced by surface to be tested 90 of substantially the same curvature, the hologram recorded in emulsion layer 18 being disposed in the same relationship in which it was made, as indicated in FIGS. 3 and 4. The hologram recorded in emulsion layer 18 will be illuminated by beam 60 which is an exact replica of beam 30 (FIG. 3) used in making the hologram. The transmission hologram formed by beams 10 and 30 (FIG. 3) reconstructs rays 72 and 74 which form beam 70 which is a replica of beam 10 (FIG. 3). Rays 72 and 74 are reflected by test surface 90 into rays 82 and 84 respectively to form beam 80. The reflection hologram formed by beams 20 and 30 (FIG. 3) reconstruct beam 110, comprising rays 112 and 114, which is a replica of beam 20 (FIG. 3). Beams 110 and 80 are allowed to fall on a viewing screen 120 where interference fringes representing the differences between the test surface 90 as represented by beam 80 and the master surface 50 (FIG. 3) as represented by beam 110 may readily be viewed.

Beam 70 is represented by dotted lines, it being simply a projection of rays 72 and 74 and which does not actually exist.

Beam 100 is simply a reflection of beam 60 from surface 90 and plays no part in this invention.

Figure 6:
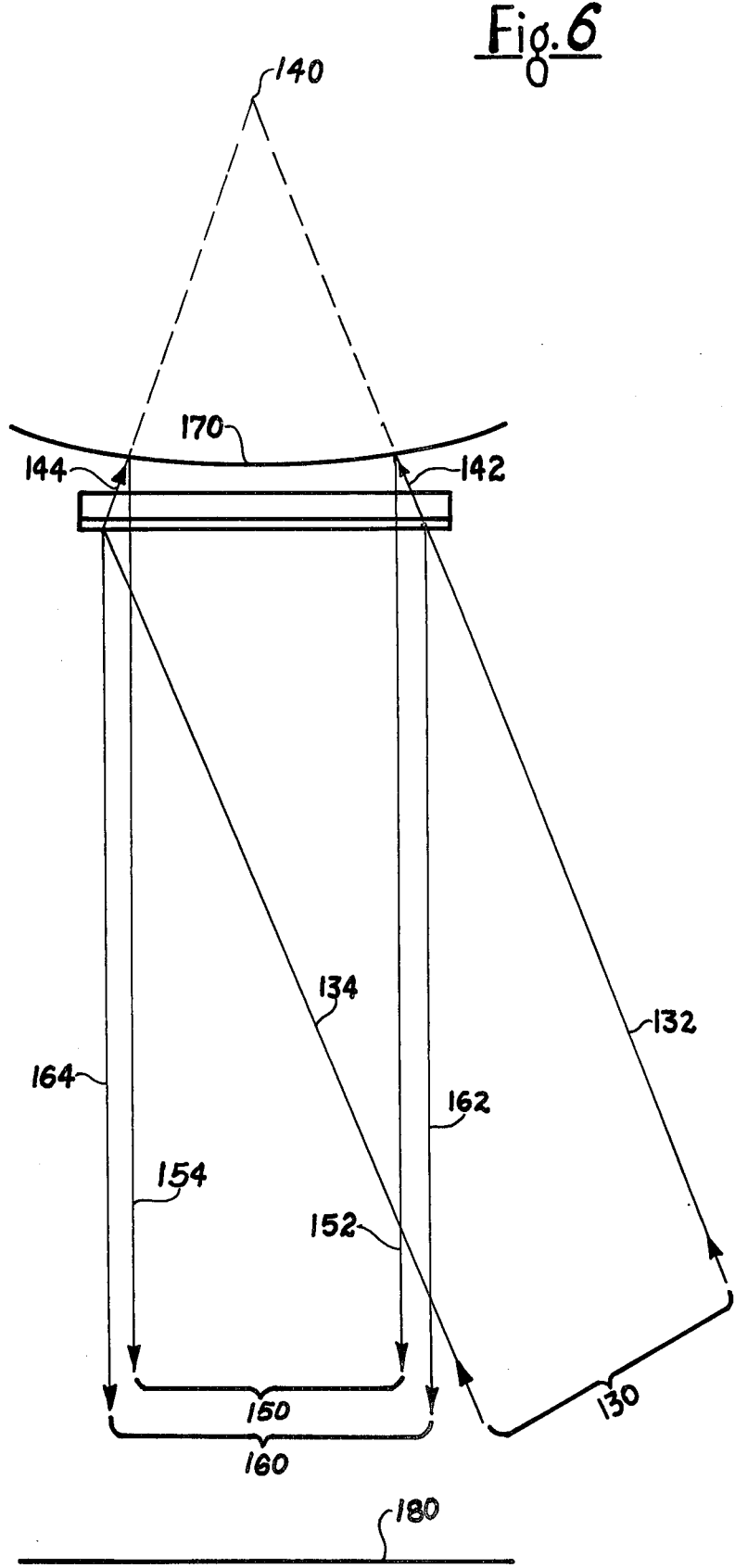

The very same hologram used in testing concave surfaces can readily be employed in the testing of convex surfaces as diagrammatically illustrated in FIG. 6 of the drawings, by simply reconstructing the conjugate wavefronts, which may be accomplished in the case of a collimated beam 30 (FIG. 3) by illuminating the hologram from the opposite direction by collimated beam 130, comprising rays 132 and 134, which results in the transmission hologram formed by beams 10 and 30 (FIG. 3) reconstructing the converging wavefront or beam 140 made up of rays 142 and 144 of exactly the same radius of curvature as beam 10. If a convex surface 170 of substantially the same radius as concave master surface 50 (FIG. 3) is placed as shown in FIG. 6, rays 142 and 144 will be reflected from surface 170 into rays 152 and 154 respectively to form beam 150 which has a curvature opposite to beam 80 (FIG. 5). The reflection hologram formed by beams 30 and 20 (FIG. 3) will reflect beam 160, comprising rays 162 and 164, which beam is of opposite curvature to beam 20 (FIG. 3). These two beams, i.e., beam 160 representing a master surface of curvature opposite to surface 50, and beam 150 interfere on screen 180 where interference fringes representing the differences between the test surface 170, as represented by beam 160 and the master surface as represented by beam 150 can be viewed.

Beam 140 is shown in dotted lines because convex surface 170 interrupts rays 142 and 144 comprising this beam.

In the practice of my invention, any suitable holder for receiving the hologram, and a jig for holding the surface to be tested, such, for example, as a collar against which the surface may be held by hand, or by a micrometer stage for measuring power precisely, will be satisfactory. Of course, a source of coherent diverging light will also be required.

It is apparent from the foregoing description that I have provided holographic testing and inspecting means wherein the hologram contains the entire interferometer, and serves as both a master and an illuminating source for the surfaces to be so tested or inspected. No overpower optic is needed for testing convex surfaces, nor mirrors or beamsplitters for concave or convex surfaces. Further, all of the complicated optics takes place in he recording process step and not in the test instrument.

I claim:

1. In a process for holographically testing concave and convex surfaces wherein a hologram serves as both a master and an illuminating source for said surfaces to be tested, said process requiring no overpower optics, mirrors or beamsplitters, said process of making a hologram of a master surface comprising the steps of illuminating said master surface with a first beam of coherent light diverging from a point near the focal plane of said master surface through a photographic plate, said photographic plate being further illuminated with a second coherent beam of arbitrary curvature, forming a plurality of holograms on said photographic plate including a transmission hologram of said first beam by interference of said first and second beams, and a reflection hologram of a third beam comprising said first beam reflected from said master surface, by interference of said second and third beams, placing said photographic plate containing said reflection and transmission holograms before a concave or convex surface for holographically testing the surfaces thereof.

2. The process as described in claim 1 wherein said transmission hologram is formed by said first and second beams interfering in said photographic plate, and said reflection hologram is formed by said second and third beams interfering in said photographic plate.

3. The process as described in claim 2 wherein said surface to be tested is concave and comprising the steps of replacing said master surface with said concave surface of substantially equal curvature, illuminating said photographic plate with a fourth beam replicating said second beam, said transmission hologram in said photographic plate reconstructing a fifth beam replicating said first beam, said fifth beam striking said concave surface and reflecting from said surface back through the photographic plate as a sixth beam, said reflection hologram in said photographic plate reconstructing a seventh beam replicating said third beam, and viewing said sixth and seventh beams on a viewing screen indicating interference fringes representing differences between said master and concave surfaces.

4. The process as described in claim 2 wherein said surface to be tested in convex and comprising the steps of replacing said master surface with said convex surface of substantially equal radius, rotating said photographic plate by 180° about an axis lying in its plane, illuminating said photographic plate with an eighth beam replicating said second beam, said transmission hologram in said photographic plate reconstructing a ninth beam conjugate to said first beam, said ninth beam striking said convex surface and reflecting from said surface back through the photographic plate as a tenth beam, said reflection hologram in said photographic plate reconstructing an eleventh beam conjugate to said third beam, viewing said tenth and eleventh beams on a viewing screen indicating interference fringes representing differences between said master and convex surfaces.

5. A process for holographically testing concave and convex lens surfaces wherein a hologram serves as both a master and an illuminating source for said surfaces to be tested, said process comprising the steps of illuminating a photographic plate with three coherent light beams, said beams including a first beam having a plane wave representative of a master surface entering from opposite side of said photographic plate, a second beam diverging from a point near focal plane of surface to be tested, and a third beam having arbitrary curvature causing interference of each of said beams to form a plurality of holograms on said photographic plate, said plurality of holograms including a reflection hologram produced by said first beam and said third beam, and a transmission hologram produced by said second and said third beams, placing said photographic plate containing said transmission and reflection holograms before a surface to be tested, illuminating said photographic plate with a replica of said third beam, said transmission hologram producing a replica of said second beam, said reflection hologram producing a replica of said first beam, directing said replica of said first beam and the reflection of said second beam from said test surface onto a viewing screen, and observing interference fringes representing differences between said plane wave representative of said master surface and surface to be tested on said viewing screen.

\* \* \* \* \*